United States Patent
Deneau et al.

(10) Patent No.: US 8,342,922 B2
(45) Date of Patent: Jan. 1, 2013

(54) RECIRCULATION AIR FLOW ARRANGEMENT FOR VEHICLE HVAC SYSTEM

(75) Inventors: Kenneth S. Deneau, Troy, MI (US); Tushar A. Desai, Farmington, MI (US); Chad H. Morrison, Madison Heights, MI (US); William J. Elliott, Commerce, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 965 days.

(21) Appl. No.: 11/831,313

(22) Filed: Jul. 31, 2007

(65) Prior Publication Data

US 2009/0036047 A1  Feb. 5, 2009

(51) Int. Cl.
*B60H 3/00* (2006.01)
(52) U.S. Cl. ........................................ 454/156; 454/906
(58) Field of Classification Search .................. 454/145, 454/154, 155, 143, 139, 262, 156, 157, 158, 454/159, 160, 906, 140; 62/129
See application file for complete search history.

(56) References Cited

U.S. PATENT DOCUMENTS

| 5,836,813 A * | 11/1998 | Miyata et al. ................. 454/139 |
| 6,386,966 B1 * | 5/2002 | Kuwayama et al. .......... 454/139 |
| 6,669,548 B2 * | 12/2003 | Fujiwara ....................... 454/143 |
| 6,796,768 B2 * | 9/2004 | Fujinaka et al. ........... 415/208.5 |
| 6,942,459 B2 * | 9/2005 | Li et al. ......................... 416/178 |
| 7,520,804 B2 * | 4/2009 | Venkatappa et al. .......... 454/139 |
| 2007/0160458 A1 * | 7/2007 | Yen ............................... 415/119 |

FOREIGN PATENT DOCUMENTS

| JP | 60169317 A | * | 9/1985 |
| JP | 01056224 A | * | 3/1989 |
| JP | 08247090 A | * | 9/1996 |

* cited by examiner

*Primary Examiner* — Steven B McAllister
*Assistant Examiner* — Brittany E Towns
(74) *Attorney, Agent, or Firm* — Ralph E. Smith

(57) ABSTRACT

A blower assembly for an automotive heating, ventilation, and air conditioning system includes a housing having an opening and a blower wheel supported by the housing that directs air through the opening of the housing. A plurality of ribs are disposed within the opening of the housing and define a plurality of channels for directing air through the opening of the housing and toward the blower wheel.

16 Claims, 3 Drawing Sheets

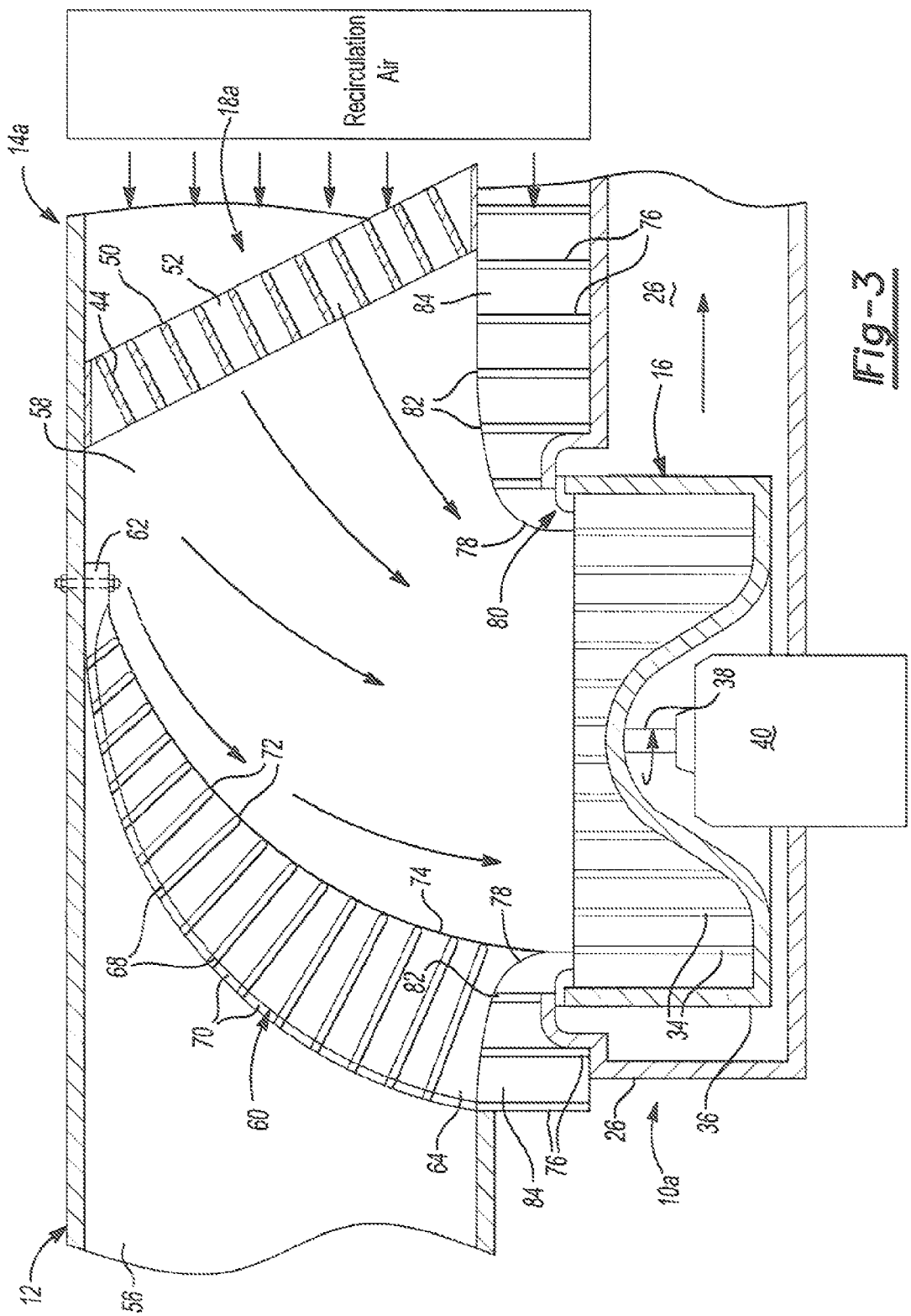

RECIRCULATION AIR FLOW ARRANGEMENT FOR VEHICLE HVAC SYSTEM

FIELD

The present invention relates to heating, ventilation, and air conditioning systems, and more particularly, to a blower assembly for a heating, ventilation, and air conditioning system.

BACKGROUND

Automotive heating, ventilation, and air conditioning (HVAC) systems typically include a blower assembly that draws air into the HVAC system and circulates the air from the HVAC system into a passenger compartment of a vehicle. Such automotive HVAC systems conventionally include a fresh-air mode that draws air into a passenger compartment of the vehicle from an area external to the vehicle and a recirculation mode that draws air from within the passenger compartment of the vehicle.

The HVAC system typically includes a series of ducts that are positioned within the vehicle to draw air from an area outside of the vehicle when the HVAC system is in the fresh-air mode and to draw air into the HVAC system from the passenger compartment of the vehicle when the HVAC system is in the recirculation mode. Operation of the HVAC system in either the fresh-air mode or the recirculation mode creates a noisy condition due to the flow of air through the duct work and into a blower of the HVAC system. Such noise is increased when the HVAC system is operating in the recirculation mode, as an inlet to the HVAC system that directs air from the passenger compartment into the HVAC system is typically located within the passenger compartment.

SUMMARY

A blower assembly for an automotive heating, ventilation, and air conditioning system includes a housing having an opening and a blower wheel supported by the housing that directs air through the opening of the housing. A plurality of ribs are disposed within the opening of the housing and define a plurality of channels for directing air through the opening of the housing and toward the blower wheel.

In another configuration, a blower assembly includes a housing having a first inlet and a second inlet and a blower wheel in selective communication with the first inlet and the second inlet of the housing. A door is rotatably attached to the housing and is movable between a first position blocking the second inlet to place the blower wheel in fluid communication with the first inlet and a second position blocking the first inlet to place the blower wheel in fluid communication with the second inlet. The door includes a plurality of spaced-apart ribs formed on a surface thereof to direct air from the first inlet and the second inlet toward the blower wheel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a partial sectional view of an automotive HVAC system incorporating a blower assembly in accordance with the principles of the present invention with the HVAC system in a recirculation mode.

DETAILED DESCRIPTION

Figure 1:
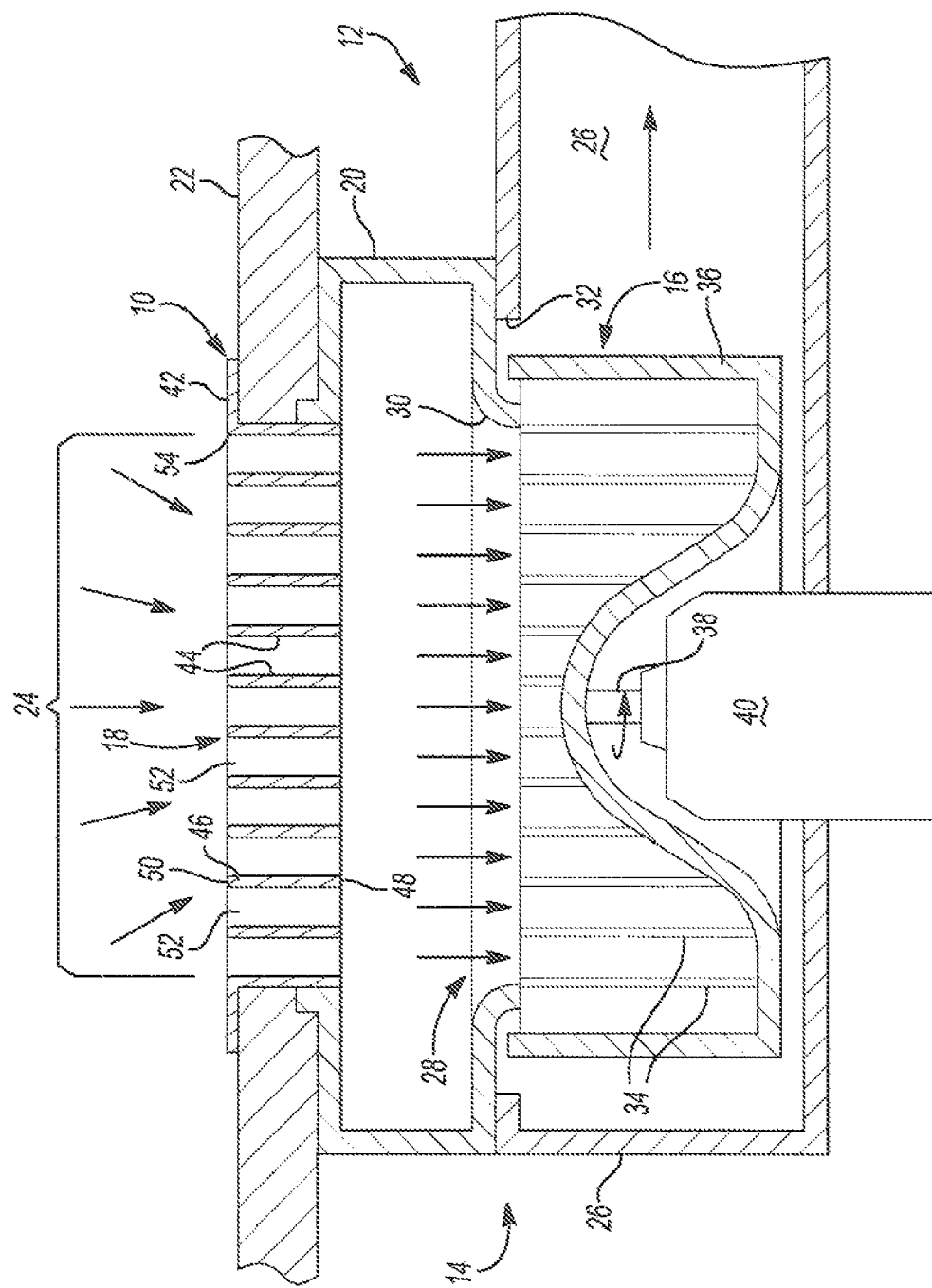
FIG. 1 is a partial cross-sectional view of a automotive heating, ventilation, and air conditioning (HVAC) system incorporating a blower assembly in accordance with the principles of the present invention.

The following description of the preferred embodiments is merely exemplary in nature and is in no way intended to limit the invention, its application, or uses.

With reference to the figures, a blower assembly 10 for use with an automotive heating, ventilation, and air conditioning (HVAC) system 12 is provided and includes a housing 14, a blower wheel 16 supported by the housing 14, and a flow-control device 18. The flow-control device 18 cooperates with the housing 14 to reduce turbulence and supply the blower wheel 16 with a uniform air stream.

With reference to FIG. 1, the housing 14 includes a plenum 20, a top wall 22 including an opening 24 in communication with the plenum 20, and a blower-discharge duct 26 that receives air from the blower wheel 16 and distributes the air throughout the HVAC system 12. The plenum 20 receives air from the opening 24 of the top wall 22 and directs the air toward the blower wheel 16. The plenum 20 may include an outlet 28 that directs air from the opening 24 of the top wall 22 into the blower wheel 16.

The top wall 22 extends generally across the plenum 20 in a direction substantially perpendicular to a direction of air flow through the opening 24. The opening 24 is positioned along the top wall 22 such that the opening 24 opposes the outlet 28 of the plenum 20. Therefore, air flow into the opening 24 of the top wall 22 is received by the plenum 20 and is directed toward the blower wheel 16 via the outlet 28 of the plenum 20.

The duct 26 may be attached to the plenum 20 on an opposite side of the plenum 20 from the top wall 22 and may rotatably support the blower wheel 16 therein. The duct 26 may include an opening 32 receiving a portion of the outlet 28 of the plenum 20 therein, whereby the opening 32 permits the blower wheel 16 to rotate relative thereto and draw air into the plenum 20 through the opening 24 of the top wall 22. The duct 26 may be in fluid communication with a passenger compartment of a vehicle (neither shown) to supply the passenger compartment with conditioned air from the automotive HVAC system 12. Air drawn into the blower wheel 16 from the opening 24 (via the plenum 20) is forced through the duct 26 due to rotation of the blower wheel 16.

The blower wheel 16 may include a series of air foils 34 supported by a hub 36. The hub 36 may be fixedly attached to an armature 38, which is rotatably driven by a motor 40. Rotation of the armature 38 by the motor 40 causes concurrent rotation of the air foils 34 and hub 36 relative to the duct 26. Rotation of the air foils 34 and hub 36 causes the air foils 34 to force air into the opening 32 of the duct 26 and imparts a negative pressure on the plenum 20. The negative pressure experienced by the plenum 20 causes the plenum 20 to draw air into the opening 24 formed in the top wall 22 in an effort to stabilize pressure within the plenum 20. Air drawn into the duct 26 via the opening 24 and plenum 20 is directed through the duct 26 for conditioning by the automotive HVAC system 12 prior to being supplied to the passenger compartment of the vehicle.

The flow-control device 18 extends across the opening 24 of the top wall 22 and includes a housing 42 and a plurality of ribs 44. The plurality of ribs 44 cooperate with the housing 42 to direct and streamline air into the plenum 20 through the opening 24. The housing 42 generally surrounds a perimeter of the opening 24 and may be attached to the top wall 22 or integrally formed with the top wall 22. Similarly, the ribs 44 may be fixedly attached to the housing 42 or may be integrally formed with the housing 42.

Each of the plurality of ribs 44 includes a leading end 46 and a trailing end 48 that cooperate to direct air through the opening 24 and toward the plenum 20. The leading end 46 may include an arcuate or radiused surface 50 that facilitates entry of air into the opening 24. Furthermore, each rib 44 includes a length greater than a width to enhance the ability of each rib 44 to minimize the turbulence of the air passing through the opening 24.

The plurality of ribs 44 cooperate to define a plurality of channels 52 through which air travels when passing through the opening 24 of the top wall 22. The channels 52 include a length substantially equal to a length of each rib 44 and a width defined by the spacing of adjacent ribs 44, whereby the length of each rib 44 is greater than the spacing between adjacent ribs 44. The overall length of the ribs 44, and thus, the length of the channels 52, may be designed in conjunction with the spacing of adjacent ribs 44 to maximize air flow into the opening 24 while concurrently allowing the ribs 44 and channels 52 to reduce the turbulence of the incoming air flow prior to the air reaching the blower wheel 16.

The ribs 44 may be positioned within the HVAC system 12 such that air entering the HVAC system 12 only contacts the ribs 44 when the HVAC system 12 is operating in a recirculation mode. The ribs 44 direct the incoming air toward the blower wheel 16 (FIG. 3) to reduce turbulence and direct blower noise away from the blower-outlet duct 26. Furthermore, such ribs 44 may be used to "tune" the airflow to optimize the turbulence and/or noise associated with operation of the HVAC system 12 in the recirculation mode.

Figure 2:
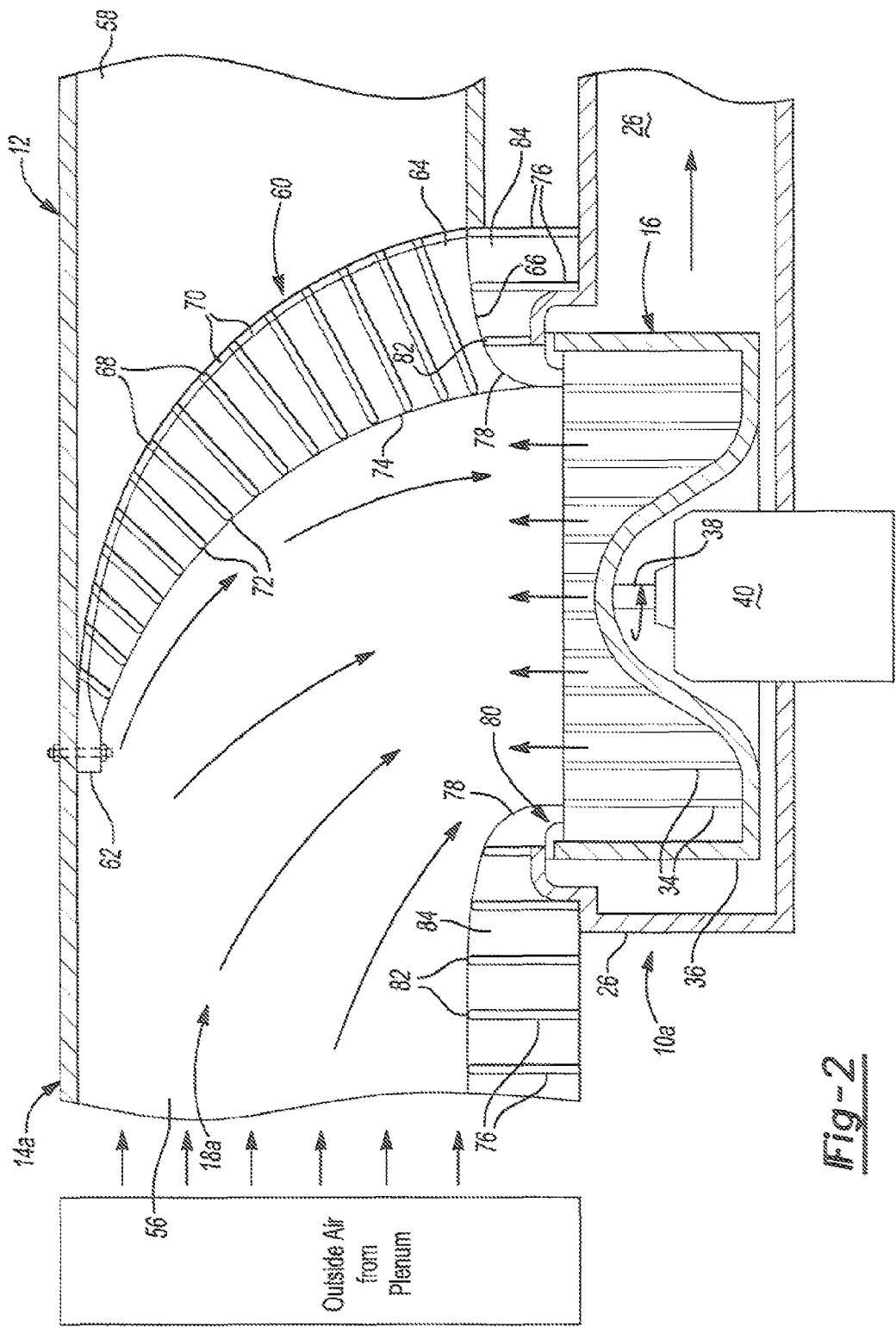
FIG. 2 is a partial sectional view of an automotive HVAC system incorporating a blower assembly in accordance with the principles of the present invention with the HVAC system in a fresh-air mode.

When the HVAC system 12 is operating in a fresh-air mode, entering air does not encounter the ribs 44. Rather, air entering the HVAC system 12 in the fresh-air mode directly encounters the blower wheel 16 (FIG. 2). While the HVAC system 12 is shown and described as only including ribs 44 during operation of the HVAC mode in the recirculation mode (FIGS. 2 and 3), the HVAC system 12 may additionally or alternatively incorporate ribs 44 during operation in the fresh-air mode as well.

With reference to FIG. 1, operation of the blower assembly 10 will be described in detail. When the motor 40 is energized, the motor rotates the armature 38 at a predetermined speed and causes concurrent rotation of the air foils 34 and hub 36 therewith. As described above, rotation of the air foils 34 and hub 36 causes the blower wheel 16 to draw air into the duct 26 via the plenum 20 and opening 24. The incoming air initially engages the flow-control device 18 and enters the opening 24 of the top wall 22 between the plurality of ribs 44 (i.e., within the channels 52). The air is directed into the opening 24 by the arcuate surface 50 of each rib 44 and may also be directed into the housing 42 by a radiused edge 54 of the housing 42.

The incoming air is directed into the channels 52 disposed between the ribs 44 and travels along the length of each rib 44. Because the incoming air is often turbulent, requiring the air to travel along a length of each rib and through each channel 52 reduces the turbulence and causes the air flow to approximate a laminar flow. Reducing the turbulence of the incoming air flow reduces the noise associated with the air being drawn through the opening 24 of the top wall 22. Without the ribs 44 and channels 52 of the flow-control device 18, the turbulent flow will be drawn into the opening 24 of the top wall 22 by the air foils 34 and hub 36 of the blower wheel 16, thereby creating an undesirable noise condition, which may be experienced by passengers disposed within the passenger compartment of the vehicle.

Requiring turbulent air to flow between and along a length of each rib 44 partially converts the turbulent incoming air into a laminar air stream prior to the air reaching the plenum 20 and creates a pressure drop across opening 24. Creation of the pressure drop across opening 24 improves the uniformity of the airflow into the blower wheel 16. Therefore, when air flows through the plenum 20 and into the blower wheel 16, the air is substantially a uniform flow perpendicular to an inlet of the blower wheel 16 and the noise associated with the blower wheel 16 in drawing air into the opening 24 of the top wall 22 is mitigated.

With reference to FIGS. 2 and 3, a blower assembly 10*a* is provided. In view of the substantial similarity in structure and function of the components associated with the blower assembly 10 with respect to the blower assembly 10*a*, like reference numerals are used hereinafter and in the drawings to identify like components while like reference numerals containing letter extensions are used to identify those components that have been modified.

As with the blower assembly 10, the blower assembly 10*a* may be used with an automotive HVAC system 12. The blower assembly 10*a* includes a housing 14*a*, a blower wheel 16, and a flow-control device 18*a*. The housing 14*a* and flow-control device 18*a* cooperate to direct air through the housing 14 and generally toward the blower wheel 16 while concurrently reducing the turbulence of the air received by the blower wheel 16.

The housing 14*a* includes a first inlet 56 and a second inlet 58. The first inlet 56 and second inlet 58 are in selective communication with the blower wheel 16 to selectively supply the blower wheel 16 with air. In one configuration, the first inlet 56 is fluidly coupled to an area outside of a vehicle (not shown) to supply a passenger compartment (not shown) of the vehicle with air from an area external of the vehicle. When the first inlet 56 of the housing 14*a* is in communication with the blower wheel 16 such that air from outside of the vehicle is supplied to the blower wheel 16 via the housing 14*a*, the automotive HVAC system 12 is in a "fresh-air" mode.

When the second inlet 58 of the housing 14*a* is in fluid communication with the blower wheel 16, the second inlet 58 directs air from within the passenger compartment of the vehicle to the blower wheel 16. When the second inlet 58 of the housing 14*a* directs air from within the passenger compartment of the vehicle to the blower wheel 16 via the housing 14*a*, the automotive HVAC system 12 is in a "recirculation" mode such that air from within the passenger compartment of the vehicle is continually recirculated between the passenger compartment and the automotive HVAC system 12. In either configuration, the air received by the blower wheel 16 is circulated through the automotive HVAC system 12 to allow the automotive HVAC system 12 to condition the air prior to directing the air to the passenger compartment of the vehicle.

The flow-control device 18*a* cooperates with the first inlet 56 and second inlet 58 of the housing 14*a* to supply the blower wheel 16 with either air from an area outside of the vehicle or from air disposed within the passenger compartment of the vehicle. The flow-control device 18*a* includes a door 60 rotatably supported by the housing 14*a* between a first position (FIG. 2) and a second position (FIG. 3). When the door 60 is in the first position, the automotive HVAC system 12 is in the fresh-air mode such that air is directed to the blower wheel 16 via the first inlet 56 of the housing 14a. When the door 60 is in the second position, the automotive HVAC system 12 is in the recirculation mode such that air from the second inlet 58 of the housing 14a is directed to the blower wheel 16.

The door 60 includes an arcuate shape having a first end 62 rotatably attached to the housing 14a and a second end 64 including a generally arcuate surface 66. The door 60 includes a series of ribs 68 spaced apart and disposed along a length of the door 60. The ribs 68 cooperate to define a plurality of channels 70, which separate adjacent ribs 68. Each of the ribs 68 includes and edge having a surface 72, whereby adjacent surfaces 72 of the respective ribs 68 cooperate to define a sweeping surface of the door 60 that causes air entering the housing 14a to be directed toward the blower wheel 16. Taken together, the surfaces 72 of the ribs 74 cooperate to provide the door 60 with a generally arcuate and sweeping surface 74. The arcuate surface 74 of the door 60 reduces the turbulence of the air entering the housing 14a and transforms the air flow into a generally uniform flow. Transforming the incoming air flow from a highly turbulent flow to a uniform flow provides the blower wheel 16 with a uniform air stream and, therefore, reduces noise associated with air entering through the housing 14a and moving toward the blower wheel 16.

While the channels 70 do not direct the entering air toward the blower wheel 16, the channels 70 mitigate noise associated with air flowing through the housing 14a and/or along the surface 74 of the door 60. For example, as air flows along the surface 74 of the door 60, some of the noise associated with such movement may travel along the channels 70 and be dissipated prior to the noise traveling with the air from the blower wheel 16 and into the passenger compartment of the vehicle. The ribs 68 and channels 70 may be integrally formed with the door 60 during formation of the door 60. For example, if the door 60 is manufactured using an injection molding process, the ribs 68 and channels 70 may be integrally formed during molding of the door 60.

In addition to the structure of the door 60, the flow-control device 18a may include a series of concentric ribs 76 that cooperate to provide an arcuate surface 78 proximate to an inlet 80 of the blower wheel 16. Each of the concentric ribs 76 includes an outer surface 82 that cooperates with adjacent surfaces 82 to define arcuate surfaces 78.

The concentric ribs 76 define a plurality of channels 84 that extend along a length of each concentric rib 76. The channels 84 cooperate with the concentric ribs 76 to reduce the noise associated with the entering air at the inlet 80 of the blower wheel 16. Specifically, as air enters the housing 14a, the air travels along the arcuate surface 78 defined by the concentric ribs 76 and is directed toward the inlet 80 of the blower wheel 16 due to the overall shape of the arcuate surface 78 and the force imparted on the air by the blower wheel 16.

The arcuate surface 78 reduces the turbulence of the incoming air and provides the blower wheel 16 with a uniform air stream. Reducing the turbulence concurrently reduces the noise associated with the air moving through the housing 14a. Any noise that is associated with the moving air within the housing 14a may be received within the channels 84 and may be dissipated by the channels 84 prior to being directed through the duct 26 and into the passenger compartment of the vehicle.

With continued reference to FIGS. 2 and 3, operation of the blower assembly 10a will be described in detail. When the door 60 is in the position shown in FIG. 2, the automotive HVAC system 12 is in the fresh-air mode. When the door 60 is in the position shown in FIG. 3, the automotive HVAC system 12 is in the recirculation mode. Because operation of the blower assembly 10a is substantially identical when the automotive HVAC system 12 is in the fresh-air mode and the recirculation mode, operation of the blower assembly 10a will be described with regard to the automotive HVAC system 12 being in the fresh-air mode, as shown in FIG. 2.

When the door 60 is positioned, as shown in FIG. 2, fresh-air from an area outside of the vehicle is drawn into the housing 14a when the motor 40 is energized. Specifically, when the motor 40 is energized, the air foils 34 and hub 36 are rotated by the armature 38 relative to the housing 14a and duct 26 and therefore cause air to be drawn into the first inlet 56 of the housing 14a. The entering air travels along a first path proximate to the surface 74 of the door 60 and along a second path proximate to the arcuate surface 78 formed by the concentric ribs 76.

Air traveling proximate to the door 60 travels along the surface 74 created by the surfaces 72 of the respective ribs 68 formed on the door 60. The shape of the door 60 in combination with the ribs 68 causes the air within the housing 14a to travel generally along the arcuate surface 74 and, therefore, causes the air to travel substantially in the same direction and along the same path. Causing the air to travel in the same direction and along the same path reduces the turbulence of the incoming air and, therefore, provides the blower wheel 16 with a uniform air stream. Furthermore, such reduction in turbulence mitigates the noise associated with air being drawn into the housing 14a and traveling along the door 60.

Air traveling along the arcuate surface 78 is directed towards the inlet 80 of the blower wheel 16. Because the air is directed along the arcuate surface 78, the air experiences a reduction in turbulence and the blower wheel 16 is supplied with a uniform air stream. As noted above, supplying the blower wheel 16 with a uniform air stream mitigates noise associated with the air traveling through the housing 14a and into the blower wheel 16.

As shown in FIGS. 2 and 3, the second end 64 of the door 60 includes an arcuate surface 66, which includes a shape that generally corresponds to the arcuate surface 78. The shape of the second end 64 along with arcuate surface 74 of the door 60 allows the door 60 to direct air toward the blower unit 16 and restricts air from traveling generally between the door 60 and arcuate surface 78.

As indicated above, the blower assembly 10a may be used in conjunction with the automotive HVAC system 12 when the automotive HVAC system 12 is in the fresh-air mode or the recirculation mode. To place the automotive HVAC system 12 in the recirculation mode, a force may be applied to the door 60 to rotate the door about the first end 62 and relative to the housing 14a. Once the door 60 is sufficiently rotated about the first end 62 relative to the housing 14a, the door 60 will be in a position, as shown in FIG. 3. In this position, the automotive HVAC system 12 is in the recirculation mode and air from the second inlet 58 of the housing 14a is directed toward the inlet 80 of the blower wheel 16a when the motor 40 is energized. In this position, air from the first inlet 56 of the housing 14a is prevented from reaching the inlet 80 of the blower wheel 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A blower assembly for an automotive heating, ventilation, and air conditioning unit, the blower assembly comprising:
   a housing including a first inlet and a second inlet;
   a blower wheel in selective communication with said first inlet and said second inlet of said housing, said blower wheel having an axis about which said blower wheel rotates; and
   a door disposed in said housing and movable about an axis of rotation generally parallel to said blower wheel rotational axis between a first position blocking said second inlet placing said blower wheel in fluid communication with said first inlet and a second position blocking said first inlet placing said blower wheel in fluid communication with said second inlet, said door including a plurality of spaced-apart ribs formed on a surface thereof with said ribs having different lengths and defining a plurality of spaces or channels open to air being guided comprising a, a non-straight flow guide that directs air from said first inlet toward said blower wheel when said door is in said first position and that directs air from said second inlet toward said blower wheel when said door is in said second position.

2. The blower assembly of claim 1, further comprising a plurality of elongate noise mitigating channels defined by a plurality of said ribs.

3. The blower assembly of claim 1, wherein said ribs and said non-straight flow guide extend along substantially an entire length of said door from adjacent an outer wall of said housing to adjacent an inlet of said blower wheel.

4. The blower assembly of claim 1, wherein said non-straight flow guide comprises an arcuate flow guide defined by outer surfaces of said ribs arranged in an arc and in fluid flow communication with air flowing in said housing toward said blower wheel.

5. The blower assembly of claim 1, further comprising a second plurality of ribs disposed alongside an inlet of said blower wheel defining a second flow guide disposed opposite said guide when said door is in either one of said first and second positions.

6. The blower assembly of claim 5, wherein said second plurality of ribs define a plurality of recesses disposed between each of said second plurality of ribs.

7. The blower assembly of claim 5, wherein said second plurality of ribs decrease in height toward said inlet of said blower wheel such that said second flow guide comprises an arcuate flow guiding portion adjacent said blower wheel inlet.

8. The blower assembly of claim 5, wherein said second plurality of ribs are concentric and encircle said blower wheel inlet.

9. The blower assembly of claim 5, wherein said door includes a first end pivotably attached to said housing and a second end disposed adjacent said arcuate portion of said second flow guide.

10. A blower assembly for an automotive heating, ventilation, and air conditioning unit, the blower assembly comprising:
    a housing including a first inlet and a second inlet;
    a blower wheel in fluid flow communication with a blower inlet;
    a door movable between a first position blocking one of said first and second inlets placing the other one of said first and second inlets in fluid flow communication with said blower inlet and a second position blocking the other one of said first and second inlets placing the one of said first and second inlets in fluid flow communication with said blower inlet with said door comprising a series of spaced apart protrusions that defining a plurality of spaces or channel open to flowing air being guided cooperate with air flowing in said housing defining a first noise reducing flow guide directing air flowing from one of said first and second inlets toward said blower inlet and wherein said spaced apart protrusions form part of the door; and
    a plurality of upraised protrusions defining a plurality of space or channels open to flowing air being guided and encompassing said blower inlet defining a second noise reducing flow guide disposed opposite said first noise reducing flow guide when said door is in one of said first and second positions.

11. The blower assembly of claim 10 further comprising a flow device disposed upstream of said blower inlet and said door and in air flow communication with air from one of said first and second inlets when said door is disposed in one of said first and second positions, said flow device comprised of a plurality of laminar flow promoting channels through which air flows before being guided by said first and second flow guides.

12. The blower assembly of claim 10 wherein each one of said protrusions of said door comprise an outwardly extending rib having an outer surface that cooperates with air flowing toward said blower inlet in defining said first noise reducing flow guide reducing air flow noise by promoting laminar flow, and wherein each one of said protrusions encompassing said blower inlet comprise an outwardly extending rib having an outer surface that cooperates with air flowing into said blower inlet in defining said second noise reducing flow guide further reducing air flow noise by promoting laminar flow.

13. The blower assembly of claim 12 wherein said plurality of ribs that define said second noise reducing flow guide encircle said blower inlet and said door extends from an outer wall of said housing that is located opposite said blower inlet to adjacent a corresponding one of said plurality of ribs that define said second noise reducing flow guide.

14. The blower assembly of claim 12 wherein said plurality of ribs that define said first noise reducing flow guide have a plurality of different lengths such that the first noise reducing flow guide comprises a non-straight noise reducing flow guide.

15. The blower assembly of claim 10 wherein said blower wheel has an axis about which said blower wheel rotates and wherein said door is movable about an axis of rotation generally parallel to said blower wheel rotational axis between said first and second positions.

16. The blower assembly of claim 15 wherein said door includes a first end pivotably attached to said housing and a second end disposed adjacent a portion of said blower inlet.

* * * * *